(12) United States Patent
Zhang et al.

(10) Patent No.: US 8,419,474 B2
(45) Date of Patent: Apr. 16, 2013

(54) CONNECTOR WITH IMPROVED IMPEDANCE BETWEEN CONTACTS THEREOF

(75) Inventors: Yuan-Ming Zhang, Kunshan (CN); Chi-Ming Chen, Tu-Cheng (TW)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 341 days.

(21) Appl. No.: 12/838,516

(22) Filed: Jul. 19, 2010

(65) Prior Publication Data

US 2011/0013872 A1    Jan. 20, 2011

(30) Foreign Application Priority Data

Jul. 17, 2009  (CN) .............................. 200920306357

(51) Int. Cl.
*H01R 13/648*    (2006.01)

(52) U.S. Cl.
USPC .................................................. 439/607.25

(58) Field of Classification Search ............. 439/607.25, 439/607.23, 607.36, 638, 660, 79; 385/93, 385/92

See application file for complete search history.

(56) References Cited

U.S. PATENT DOCUMENTS

| | | | | |
|---|---|---|---|---|
| 5,266,038 A * | 11/1993 | Nakamura | ...................... | 439/79 |
| 5,779,489 A * | 7/1998 | Davis et al. | ...................... | 439/79 |
| 6,059,581 A * | 5/2000 | Wu | ................................. | 439/79 |
| 6,210,224 B1 * | 4/2001 | Wu | ............................. | 439/607.4 |
| 6,319,063 B1 * | 11/2001 | Huang | ..................... | 439/607.36 |
| 6,475,033 B1 * | 11/2002 | Zhu et al. | ................... | 439/607.4 |
| 7,497,732 B2 * | 3/2009 | Yi | ............................ | 439/607.23 |
| 7,559,805 B1 * | 7/2009 | Yi et al. | ........................ | 439/660 |
| 7,699,663 B1 * | 4/2010 | Little et al. | ................... | 439/660 |
| 7,794,284 B1 * | 9/2010 | He et al. | ....................... | 439/660 |
| 8,021,195 B2 * | 9/2011 | He et al. | ....................... | 439/638 |
| 2011/0021088 A1 * | 1/2011 | Chen et al. | ..................... | 439/732 |

* cited by examiner

*Primary Examiner* — Alexander Gilman

(74) *Attorney, Agent, or Firm* — Wei Te Chung; Ming Chieh Chang

(57) ABSTRACT

A connector defining a receiving opening for receiving a corresponding plug, includes an insulative housing, a plurality of contacts attached to the insulative housing, and a grounding tab. The contacts include a pair of differential signal contacts. Each differential signal contact has a first retaining portion retained in the insulative housing, a first contact portion extending to the receiving opening for contacting with the corresponding plug and a first tail portion for connecting with a circuit board. The first tail portions of the differential signal contacts define a distance which is larger than that of the corresponding first contact portions. The grounding tab is retained between the first tail portions of the pair of differential signal contacts.

20 Claims, 5 Drawing Sheets

CONNECTOR WITH IMPROVED IMPEDANCE BETWEEN CONTACTS THEREOF

BACKGROUND OF THE INVENTION

1. Field of the Invention

The present invention relates to connectors, more particularly to connectors with improved impedance between contacts thereof.

2. Description of Related Art

USB (Universal Serial Bus) 2.0 connectors are widely used in electronic device, such as computers, PDA, DVD et al. An USB 2.0 connector usually consists of an insulative housing, four contacts retained in the insulative housing and a metal shell covering the insulative housing. The insulative housing has a base and a tongue extending forwardly from a front side of the base. The base is formed with four passageways for retaining the four contacts. Each contact has a retaining portion retained in the passageways, a contact portion forwardly extending to the tongue from a front end of the retaining portion and a tail portion bending downwardly from a rear end of the retaining portion for electrically connecting with a circuit board. The metal shell covers the insulative housing and forms a receiving space with the tongue for receiving a corresponding plug.

The four contacts include a power contact for transmitting power to the electronic device, a pair of differential signal contacts for transmitting high frequency signals and a grounding contact for grounding purpose. All contact portions of the contacts in the USB 2.0 connector are averagely arranged in a row on one side of the tongue, and all tail portions of the contacts are averagely arranged in a row at a rear side of the insulative housing.

With a miniature development of the electronic device, connectors are combined with each other for decreasing areas they occupy. The USB 2.0 connector is also combined with another connector, such as a power connector, an optical module et al to decreasing areas of the electronic device. The insulative housing would define a cavity at a middle and lower side thereof to retain the another connector. The another connector backwardly extends out of a rear side of the insultive housing. Then the tail portions of the USB 2.0 connector need to bend sidewardly and form a space therebetween for receiving a rear side of the another connector, and assembling the another connector from a rear side of the insulative housing convenienly. However, when a distance between the pair of differential signal contacts is increased, an electric capacity between the differential signal contacts would be reduced at the same time, which make an impedance between the differential signal contacts becomes higher, and result in distortion of signal transmission.

Hence, an improved connector is desired to overcome the above problems.

BRIEF SUMMARY OF THE INVENTION

According to one aspect of the present invention, a connector defining a receiving opening for receiving a corresponding plug, comprises: an insulative housing having a body portion and a tongue forwardly extending into the receiving opening; a plurality of contacts attached to the insulative housing, the contacts having a pair of adjacent differential signal contacts, each differential signal contact having a first retaining portion retained in the body portion, a first contact portion extending to the tongue and exposed to the receiving opening, a first tail portion for connecting with a circuit board, and a first connecting portion connecting the first retaining portion and the first tail portion together, the first tail portions of the pair of differential signal contacts defining a distance which is larger than that between the corresponding first contact portions; and a grounding tab retained on the insulative housing and located between the first tail portions of the pair of differential signal contacts.

According to another aspect of the present invention, a connector defining a receiving opening for receiving a corresponding plug, comprises: an insulative housing; a plurality of contacts attached to the insulative housing, the contacts having a pair of differential signal contacts, and each differential signal contact having a first retaining portion retained in the insulative housing, a first contact portion extending to the receiving opening for contacting with the corresponding plug and a first tail portion for connecting with a circuit board, the first tail portions of the differential signal contacts defining a distance which is larger than that of the corresponding first contact portions; and a grounding tab retained between the first tail portions of the pair of differential signal contacts.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
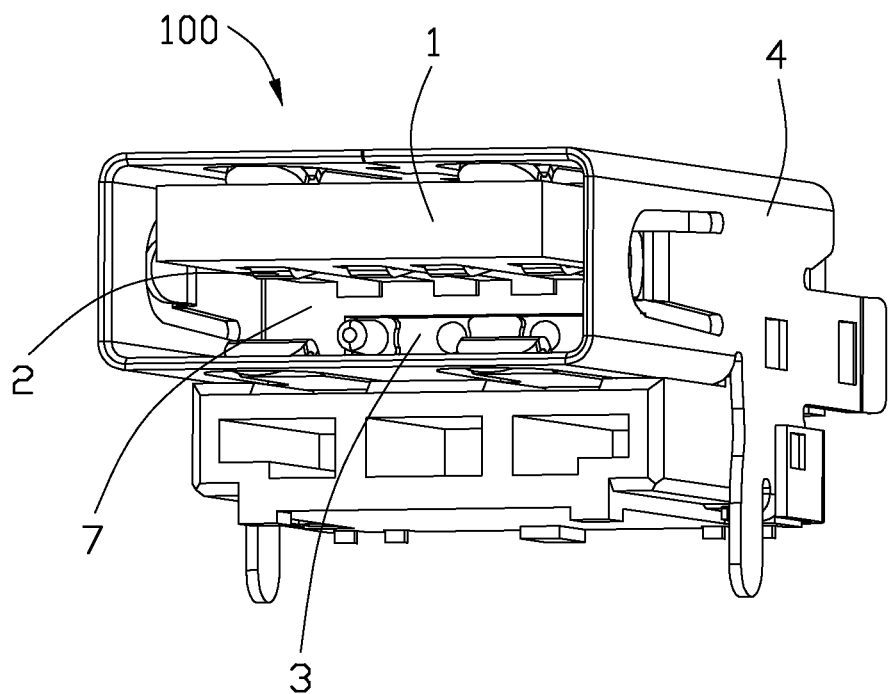
FIG. 1 is a perspective view of a connector according to the present invention.
Figure 2:
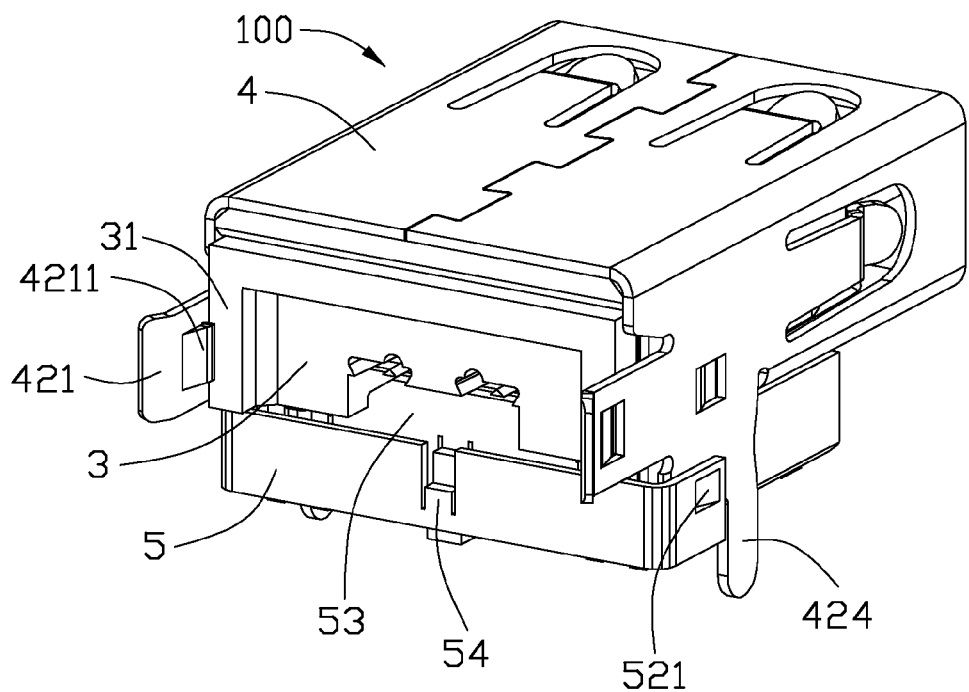
FIG. 2 is a view similar to FIG. 1, while taken from a different aspect.
Figure 3:
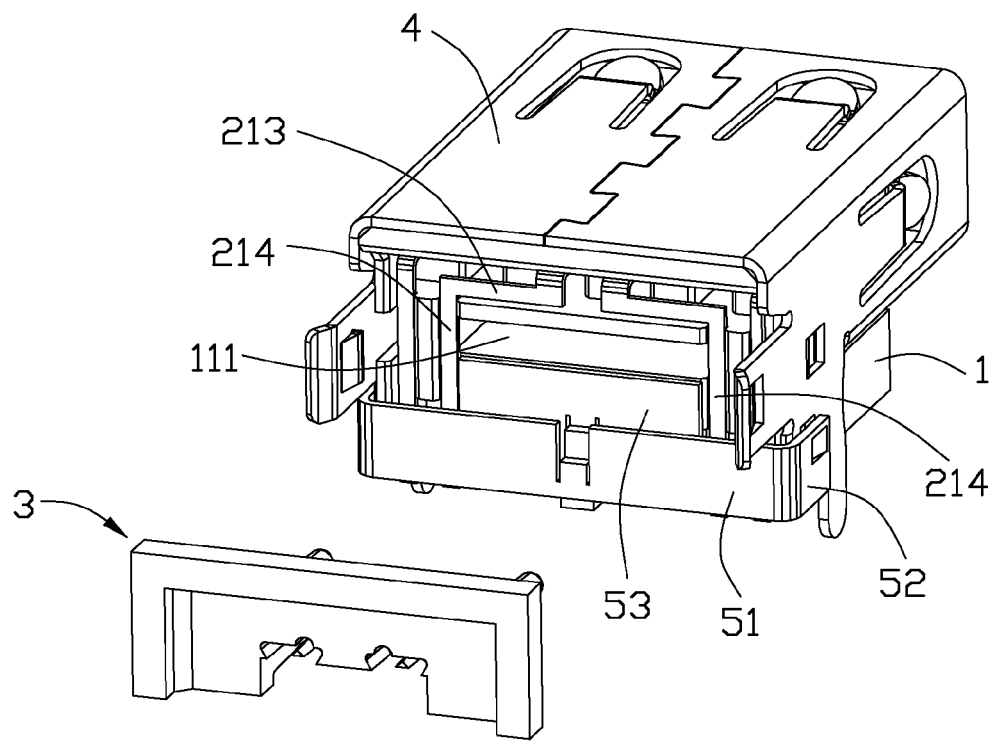
FIG. 3 is a partly exploded view of the connector shown in FIG. 2.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Figure 4:
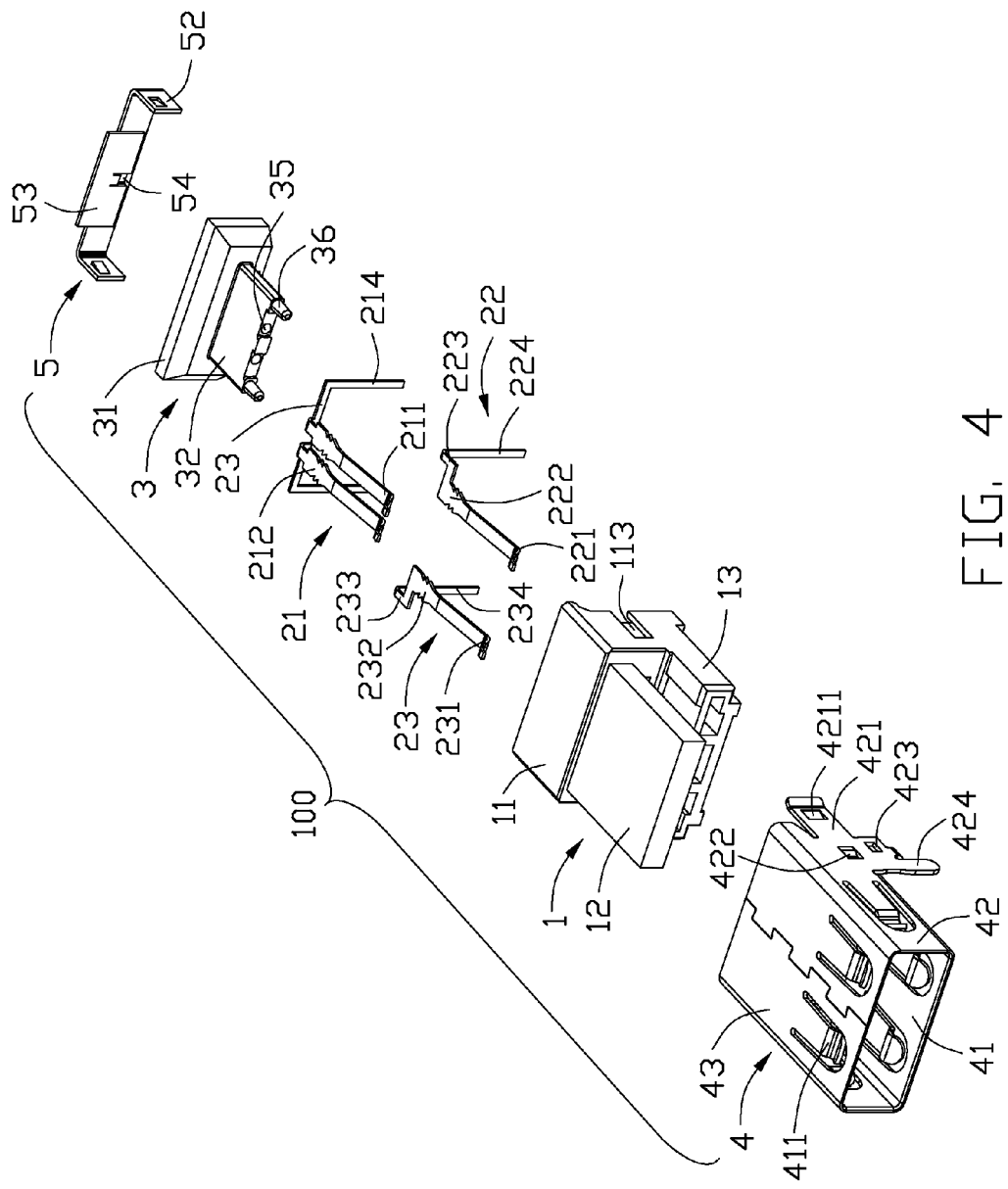
FIG. 4 is an exploded view of the connector shown in the FIG. 1.
Figure 5:
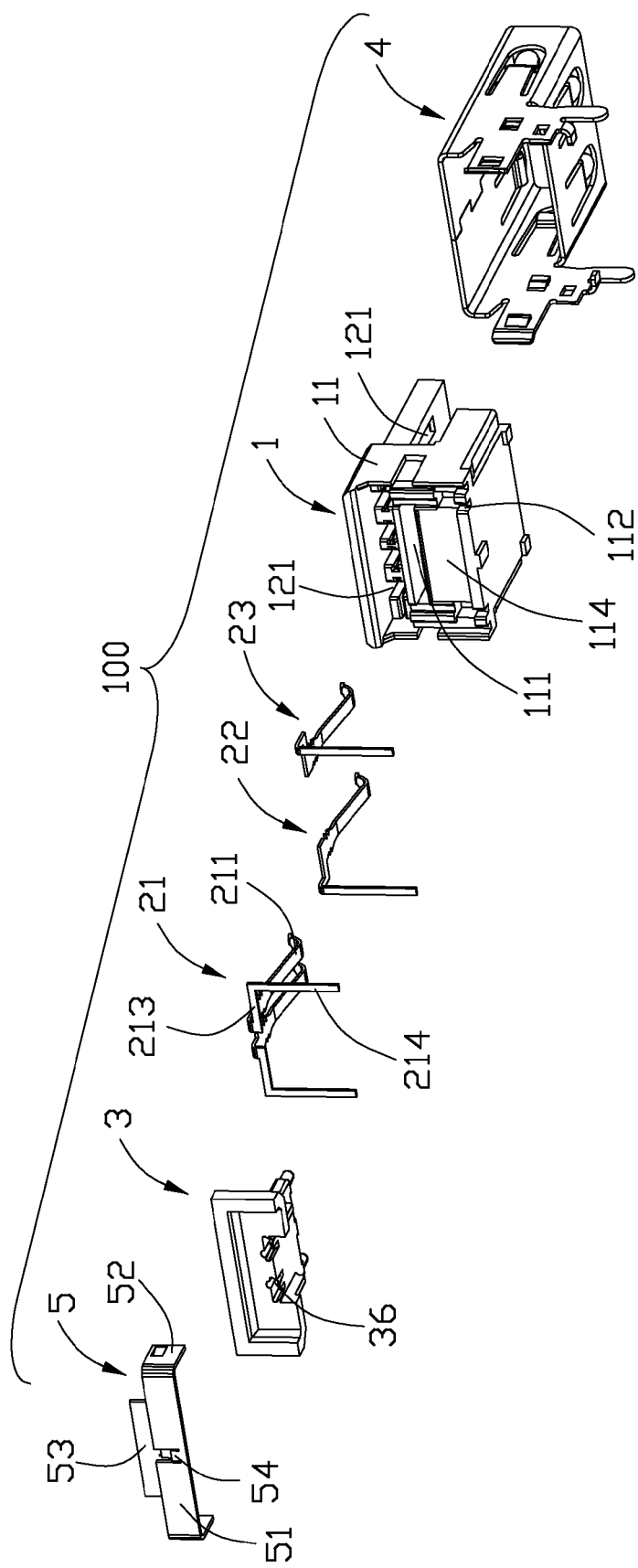
FIG. 5 is a view similar to FIG. 4, while taken from a different aspect.

Referring to FIGS. 4-5, a connector 100 for soldering to a circuit board (not shown) according to the present invention is disclosed. The connector 100 comprises an insulative housing 1, a plurality of contacts 2 and an optical module 3 retained in the insulative housing 1, and a front metal shell 4 and a rear cover 5 covering the insulative housing 1. The connector 100 defines a receiving opening 7 for receiving a corresponding plug (not shown).

Referring to FIGS. 1-5, the insulative housing 1 has a body portion 11, a tongue 12 and an assistant board 13 forwardly extending into the receiving opening 7 from upper and lower sides of the body portion 11 respectively. The body portion 11 defines a cavity 111 extending therethrough along a front to back direction and located below the tongue 12 along an up to down direction. The front to back direction is an insertion direction of the corresponding plug in the present invention. The cavity 111 communicates with the receiving opening 7 along the front to back direction and located behind the receiving opening 7. The body portion 11 defines a plurality of slots 112 at a rear side thereof The slots 112 extend along the up to down direction and are respectively arranged at two outer sides of the cavity 111. The tongue 12 defines a plurality of passageways 121 at a lower side thereof The passageways 121 extend to a rear end of the body portion 11 and communicate with the slots 112 along a transverse direction of the insulative housing 1. The body portion 11 further defines a pair of recess 113 at two sides thereof to engage with the front metal shell 4, and a depression portion 114 below the cavity 111. The depression portion 114 is located between the slots 112.

The optical module 3 is assembled to the insulative housing 1 from a rear side of the insulative housing 1. The optical module 3 has a base 31 and an extension portion 32 extending forwardly from a front side of the base 31. The base 31 is wider and thick than the extension portion 32, thereby the base 31 resists the rear side of the insulative housing 1 to prevent the optical module 3 from moving forwardly, while the extension portion 32 extends into the cavity 111. The extension portion 32 includes a pair of lens 35 at a front end thereof and a pair of posts 36 forwardly extending into the receiving opening 7 from the front end thereof The posts 36 are located at two sides of the lens 35. The lens 35 are forwardly exposed to the receiving opening 7 to mate with the corresponding plug. The optical module 3 further defines a pair of holes 36 behind the lens 35 for receiving a pair of fibers (not shown). The fibers is retained behind the lens 35 and aligned with the lens 35 along the front to back direction to transmit optical signals with the corresponding plug.

The contacts 2 are USB 2.0 contacts to transmit USB 2.0 signals. The contacts 2 comprise a pair of differential signal contacts 21, a power contact 22 and a grounding contact 23 respectively located at two sides of the differential signal contacts 21 along the transverse direction.

Each differential signal contact 21 has a first retaining portion 212 retained in the passageways 121 of the body portions 11, a first contact portion 211 forwardly extending to the tongue 12 from a front end of the body portion 212, a first tail portion 214 for connecting with the circuit board, and a first connecting portion 213 connecting the first retaining portion 212 and the first tail portion 214 together. The first contact portions 211 are cantileveredly received in the passageways 121 of the tongue 12, and protrude into the receiving opening 7 to connect with the corresponding plug.

The first connecting portions 213 firstly bend downwardly from a rear end of the retaining portion 212, then back to back bend sidewarldy along opposite two directions. The tail portions 214 bend downwardly from free ends of the corresponding connecting portions 213. The first tail portions 214 are received in the slots 112 of the body portion 11. Therefore, a distance between the first tail portions 214 becomes larger than that between the first contact portions 211; besides, the first tail portions 214 are located at two sides of the cavity 111, and the first connecting portions 213 are located at an upper side of the cavity 111 for conveniently assembling the optical module 3 to the cavity 111 from a rear side of the insulative housing 1 without any hindrance. Then the extension portion 32 is located between the first tail portions 214 along the transverse direction of the insulative housing 1 and located below the first connecting portions 213.

The power contact 22 has a second retaining portion 222 retained in the passageway 121 of the body portion 11, a second contact portion 221 forwardly extending to the tongue 12 from a front end of the second retaining portion 222, a second tail portion 224 connecting with the circuit board, and a second connecting portion 223 connecting the second retaining portion 222 and the second tail portion 224 together. The second connecting portion 223 firstly bends sidewardly from a rear end of the second retaining portion 222, then bends backwardly. The second tail portion 224 bends downwardly from a rear end of the second connecting portion 223.

The grounding contact 23 has a third retaining portion 232 retained in the passageway 121 of the body portion 11, a third contact portion 231 forwardly extending to the tongue 12 from a front end of the third retaining portion 232, a third tail portion 234 connecting with the circuit board, and a third connecting portion 233 connecting the third retaining portion 232 and the third tail portion 234 together. The third connecting portion 233 firstly bends sidewarldy from a rear end of the third retaining portion 232, then bends backwardly. The third tail portion 234 bends downwardly from a rear end of the third connecting portion 233. As described above, the power contact 22 and the ground contact 23 are symmetrical to each other. The second and third connecting portions 223, 233 are located at an upper and front side of the first connecting portions 213. The second and third tail portions 224, 234 are located at two sides of the first tail portions 214 respectively.

Therefore, all first, second and third tail portions 214, 224, 234 are located at two outer sides of the cavity 111, and all first, second and third connecting portions 213, 223, 233 are located at an upper side of the cavity 111; that is to say all first, second and third tail portions 214, 224, 234 are located at two outer sides of the extension portion 32, and all first, second and third connecting portions 213, 223, 233 are located at an upper side of the extension portion 32. The base 31 is located at a rear side of the first, second and third tail portions 214, 224, 234.

The front metal shell 4 and rear cover 5 encloses the insulative housing 1. The front metal shell 4 has a bottom wall 41, a pair of side walls 42 respectively extending upwardly from two sides of the bottom wall 41, and a top wall 43 being formed by two parts which extend toward to each other from top ends of the side walls 42. The top wall 43, bottom wall 41 and two side walls 42 have a plurality of spring arms 411 extending forwardly to engage with the corresponding plug. Each side wall 42 has an arm portion 421 extending backwardly and a mounting leg 424 extending downwardly to be mounted on the circuit board. The arm portion 421 has a barb 4211 protruding inwardly to resist a rear end of base 31, then the base 31 is sandwich between the barb 4211 and the rear side of the insulative housing 1 along the front to back direction, and sandwiched between the arm portions 421 and side walls 42 along the transverse direction. Each side wall 42 further has a locking tang 422 at a rear side thereof to abut against the recess 113 of the insulative housing 1 to prevent the metal shell 4 from moving forwardly, and a locking hole 423 below the locking tang 422 to lock the rear cover 5.

The rear cover 5 covers a rear side of the insulative housing 1. The rear cover 5 has a flat portion 51, a pair of flanges 52 extending forwardly from two sides of the flat portion 51, a grounding tab 53 extending forwardly from a middle side of the flat portion 51 and a joint portion 54 jointing the flat portion 51 and the grounding tab 53 together. The joint portion 54 is forwardly and upwardly tore from the middle position of the flat portion 51. The flat portion 51 is located below the optical module 3 and the arm portions 421 along the up to down direction. Each flange 52 has a fastening strip 521 protruding inwardly and backwardly to lock with the locking holes 423. Then the rear cover 5 is retained with the front metal shell 4 and connects with the front metal shell 4 to form a grounding path via the mounting leg 424 connecting with the circuit board.

The grounding tab 53 is parallel to the flat portion 51. The grounding tab 53 is located between the first tail portions 214 along the transverse direction, and the grounding tab 53 and the first tail portions 214 are located in a common plane. Besides, the grounding tab 53 is received in the depression 114 below the cavity 111 for making the cavity 111 open rearwardly and assembling the extension portion 32 from the rear side of the insulative housing 1 without any hindrance. Therefore, an electric capacity between the differential signal contacts 21 is increased via an intervention of the grounding tab 53 between the first tail portions 214 of the differential signal contacts 51. According to a formula of impedance, when the electric capacity between the differential signal contacts 21 is increased, the impedance between the differential signal contacts 21 will be decreased at the same time. Besides, the grounding tab 53 is located below all first, second and third connecting portions 213, 223, 233 along the up to down direction.

As fully described above, when the distance between the first tail portions 214 is increased for conveniently assembling the optical module 3 from a rear side of the insulative housing 1 without any hindrance, an impedance between the first tail portion 214 is increased, which results in a distortion of signal transmission; however, the connector 100 in the present invention further comprises the rear cover 5 with said grounding tab 53 forwardly arranged between the first tail portions 214 of the differential signal contacts 21, thereby the electric capacity between the differential signal contacts 21 is increased via the intervention of the grounding tab 53, which make the impedance between the differential signal contacts 21 be decreased to adjust the change of the impedance between the differential signal contacts 21 when the distance therebetween is increased. Then the differential signal contacts 21 will have an appropriate environment to stably transmit differential signal. Therefore, the connector 100 in the present invention not only can conveniently assembly the optical module 3 from a rear side of the insulative housing 1 without any hindrance, but also have an improved signal transmission environment for a stable differential signal transmission.

In addition, the grounding tab 53 directly extends from the flat portion 51 of the rear cover 5, of course, the grounding tab can be alternatively designed to separate from the rear cover 5, and the separated grounding tab can connect with the rear cover 5 via another joint metal sheet or directly connect with the circuit board, which can also achieve the purpose of the present invention. Besides, the distance between the first tail portions 214 is increased for assembling the optical fiber 3 without any hindrance, while optical fiber 3 can be alternatively instead by other modules or other connectors, such as power connector, to be retained in a larger cavity of the insulative housing 1 between the first tail portions 214.

In assembly, the optical module 3 is finally assembled to the insulative housing 1 when the rear cover 5 has been assembled to the insulative housing 1; then the base 31 is located behind the grounding tab 53, and the grounding tab 53 is located below the extension portion 32 along the up to down direction.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A connector defining a receiving opening for receiving a corresponding plug, comprising:
    an insulative housing having a body portion and a tongue forwardly extending into the receiving opening;
    a plurality of contacts attached to the insulative housing, the contacts having a pair of adjacent differential signal contacts, each differential signal contact having a first retaining portion retained in the body portion, a first contact portion extending to the tongue and exposed to the receiving opening, a first tail portion for connecting with a circuit board, and a first connecting portion connecting the first retaining portion and the first tail portion together, the first tail portions of the pair of differential signal contacts defining a distance which is larger than that between the corresponding first contact portions; and
    a grounding tab retained on the insulative housing and located between the first tail portions of the pair of differential signal contacts.

2. The connector as claimed in claim 1, wherein the first tail portions and the grounding tab are located at a common plane.

3. The connector as claimed in claim 2, wherein the insulative housing defines a cavity extending therethrough along an insertion direction of the corresponding plug and a plurality of slots extending along an up to down direction at two sides of the cavity, and the first tail portions are located at two sides of the cavity and received in the slots.

4. The connector as claimed in claim 3, further comprising an optical module assembled to the cavity from a rear side of the insulative housing without any hindrance, the cavity communicates with the receiving opening along the insertion direction and locates below the tongue, and the optical module has a base resisting a rear end of the insulative housing and an extension portion forwardly extending into the cavity and forwardly exposed to the receiving opening, and the extension portion is located between the first tail portions.

5. The connector as claimed in claim 3, wherein the insulative housing defines a depression below the cavity, and the grounding tab is received in the depression.

6. The connector as claimed in claim 3, wherein the first connecting portions firstly bend downwardly from a rear end of the corresponding first retaining portions, then bend sidewardly along opposite two directions, the first tail portions extend downwardly from corresponding first connecting portions, and the first connecting portions are located at an upper side of the cavity and the grounding tab.

7. The connector as claimed in claim 1, further comprising a front metal shell covering the insulative housing and a rear cover at a rear side of the insulative housing, the front metal shell has a pair of mounting legs to connecting with the circuit board and a pair of locking holes to lock with the rear cover, and the grounding tab connects with the rear cover.

8. The connector as claimed in claim 7, wherein the rear cover has a flat portion, a pair of flanges extending forwardly from two sides of the flat portion to engage with the front metal shell, and a joint portion connecting the grounding tab and the flat portion.

9. The connector as claimed in claim 1, further including an optical module defining a base with an extension portion extending into a cavity which is formed in the housing and located between the first tail portions in a rear view, wherein the grounding tab is located between the housing and the base of the optical module in a front-o-back direction.

10. The connector as claimed in claim 1, further comprising a grounding contact and a power contact at two sides of the differential signal contacts, the power contact has a second retaining portion retained in the body portion, a second contact portion forwardly extending to the tongue, a second connecting portion bending sidewardly and backwardly from a rear end of the second retaining portion, and a second tail portion bending downwardly from the second connecting portion, the grounding contact is symmetrical to the power contact and has a third retaining portion retained in the body portion, a third contact portion forwardly extending to the tongue, a third connecting portion bending sidewardly and backwardly from a rear end of the third retaining portion, and a third tail portion bending downwardly from the third connecting portion, the second and third connecting portions are located at an upper and front side of the first connecting portions, and the second and third tail portions are located at two outer sides of the first connecting portions, the differential signal contacts, the grounding contact and the power contact are formed as USB 2.0 contacts to transmit USB 2.0 signals.

11. A connector defining a receiving opening for receiving a corresponding plug, comprising:
an insulative housing;
a plurality of contacts attached to the insulative housing, the contacts having a pair of differential signal contacts, and each differential signal contact having a first retaining portion retained in the insulative housing, a first contact portion extending to the receiving opening for contacting with the corresponding plug and a first tail portion for connecting with a circuit board, the first tail portions of the differential signal contacts defining a distance which is larger than that of the corresponding first contact portions; and
a grounding tab retained between the first tail portions of the pair of differential signal contacts.

12. The connector as claimed in claim 11, wherein the grounding tab and the first tail portions are located at a common plane.

13. The connector as claimed in claim 12, wherein the insulative housing defines a cavity extending therethrough along an insertion direction of the corresponding plug, and the first tail portions are located at two sides of the cavity.

14. The connector as claimed in claim 13, further comprising an optical module assembled in the cavity from a rear side of the insulative housing, the cavity communicates with the receiving opening along the insertion direction, and the optical module has a pair of lens forwardly exposed to the receiving opening, and the grounding tab is located below the cavity.

15. A combo type connector comprising:
an insulative housing including a main body and a mating tongue extending forwardly from the main body;
a metallic shell enclosing the housing and defining a mating port enclosing said mating tongue;
an optical module inserted into the main body and forwardly communicating with the mating port;
four contacts including two inner contacts and two outer contacts being side by side disposed in the housing, each of said contacts defining a horizontal retention section retaining to the main body, a resilient contacting portion extending forwardly from the retention section and exposed upon the mating tongue, and an L-shaped tail section; wherein
the L-shaped tail section of each of the two inner contacts essentially extends in a first vertical plane, and the L-shaped tail section of each of the two outer contacts essentially extends in a second vertical plane perpendicular to said first vertical plane.

16. The combo type connector as claimed in claim 15, wherein said first vertical plane extends in a transverse direction while the second vertical plane extends in a front-to-back direction perpendicular to said transverse direction.

17. The combo type connector as claimed in claim 15, wherein the tail section is located transversely outwardly with regard to the corresponding contacting section for leaving a space to allow the optical module to rearwardly extend.

18. The combo type connector as claimed in claim 16, wherein the L-shaped tail section of each of the inner contacts defines a horizontal section and a vertical section, and the L-shaped tail section of each of the outer contacts defines a horizontal portion and a vertical portion, said horizontal section being lower than the horizontal portion.

19. The combo type connector as claimed in claim 18, wherein said horizontal section lies in the first vertical plane while said horizontal portion extends in a horizontal plane.

20. The combo type connector as claimed in claim 15, wherein a ground tab is located between the L-shaped tail sections of the two inner contacts with a coplanar manner in said vertical plane for.

* * * * *